(12) United States Patent
Murayama et al.

(10) Patent No.: US 6,380,948 B1
(45) Date of Patent: Apr. 30, 2002

(54) APPARATUS FOR CONTROLLING ON SCREEN DISPLAY

(75) Inventors: Yuzo Murayama, Tokyo; Shigeyuki Sano, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/389,555

(22) Filed: Sep. 3, 1999

(30) Foreign Application Priority Data

Sep. 4, 1998 (JP) .......................... 10-251333

(51) Int. Cl.7 ................................. G09G 5/00
(52) U.S. Cl. ...................... 345/660; 345/667
(58) Field of Search ............... 345/127, 129, 345/130, 113, 115, 660, 667

(56) References Cited

U.S. PATENT DOCUMENTS

| | | | |
|---|---|---|---|
| 4,249,211 A | | 2/1981 | Baba et al. |
| 4,823,303 A | * | 4/1989 | Terasawa ................ 345/127 |
| 5,227,875 A | | 7/1993 | Suu et al. |
| 5,302,967 A | * | 4/1994 | Yonezawa et al. ......... 345/113 |
| 5,594,467 A | * | 1/1997 | Marlton et al. ........... 345/115 |
| 5,715,515 A | | 2/1998 | Akins, III et al. |
| 5,990,860 A | * | 11/1999 | Takeuchi ................ 345/113 |
| 6,144,362 A | * | 11/2000 | Kawai ................... 345/115 |
| 6,184,859 B1 | * | 2/2001 | Kojima ................... 345/113 |

FOREIGN PATENT DOCUMENTS

| | | |
|---|---|---|
| EP | 0766463 | 4/1997 |
| WO | 9501058 | 1/1995 |

* cited by examiner

*Primary Examiner*—Matthew Luu
(74) *Attorney, Agent, or Firm*—Jay H. Maioli

(57) ABSTRACT

A video signal of a sub-picture screen is supplied from an input terminal (5) via an adder (6) for superimposing display to a forming control circuit (7) for a sub-picture screen signal, and a sub-picture screen video signal, which is compressed to an arbitrary size, is synthesized with a video signal of a main picture screen from an input terminal (1) at a change-over switch (2). Further, in accordance with a command signal supplied to a microcomputer (10), a central processing unit (CPU) (11) produces a control signal which decides a size, a position and the like of display of sub-picture screen. Also, a signal from the central processing unit 11 is supplied to a display control circuit (12) which then produces a figure signal to be superimposed and displayed. Set values of size, position and the like of sub-picture screen display are recorded on and held by a random access memory (RAM) (13). The set values are supplied through the central processing unit (11) to the display control circuit (12) and hence such a figure signal is produced that the figure is reduced or expanded in response to expansion or reduction of the sub-picture screen.

2 Claims, 3 Drawing Sheets

APPARATUS FOR CONTROLLING ON SCREEN DISPLAY

BACKGROUND OF THE INVENTION

1. Field of the Invention

The present invention relates to a vide appliance suitable for use in a case where a picture screen is displayed with an arbitrary size at an arbitrary position on a display screen, for example, and in detail makes a figure to be displayed on the picture screen in a superimposed fashion easy to be seen always.

2. Description of the Related Art

In a video appliance such a television receiver for example, it is carried out that on a display screen there are displayed a main picture screen as well as a sub-picture screen which is reduced in size. On the other hand, in such a video appliance, it has been carried out that a character or a figure indicating a reception channel or the like is displayed on the picture screen displayed on the display screen in a superimposed fashion (on screen display which is simply referred to as OSD). Thus, there occurs such a case that the picture screen, in which the superimposing display is carried out, is reduced in size and then displayed as the sub-picture screen described above.

By the way, such a figure displayed in a superimposed fashion is generally made small so as not to be become an obstacle to the picture screen. If such a small figure is reduced further, there is such a fear that this figure is difficult to be recognized visually.

Namely, as shown in FIG. 4A, for example, when the "OSD" of superimposing display having a size, which does not become an obstacle in a main screen, is reduced into a sub-picture screen, the "OSD" becomes very small and is difficult to be visually recognized. On the contrary, when as shown in FIG. 4B, the "OSD" is made as a large figure to be visually recognized even in the sub-picture screen, if this picture screen is made as a main picture screen, the large figure becomes an obstacle to the picture screen.

SUMMARY OF THE INVENTION

In view of the above point, an object of the present invention is to reduce or expand a figure to be displayed in a superimposing fashion in correspondence with expansion or reduction of a picture screen. Thus, the size of the figure to be displayed in a superimposing fashion is made substantially same in size even in a reduced picture screen, and hence the figure can be visually recognized with ease.

According to an aspect of the present invention, there is provided a video appliance in which a picture screen can be arbitrarily expanded or reduced on a display screen and displayed at an arbitrary position and which can reduce or expand a figure to be displayed in a superimposing manner in association with the picture screen in response to expansion or reduction of the picture screen.

DESCRIPTION OF THE PREFERRED EMBODIMENT

Figure 1:
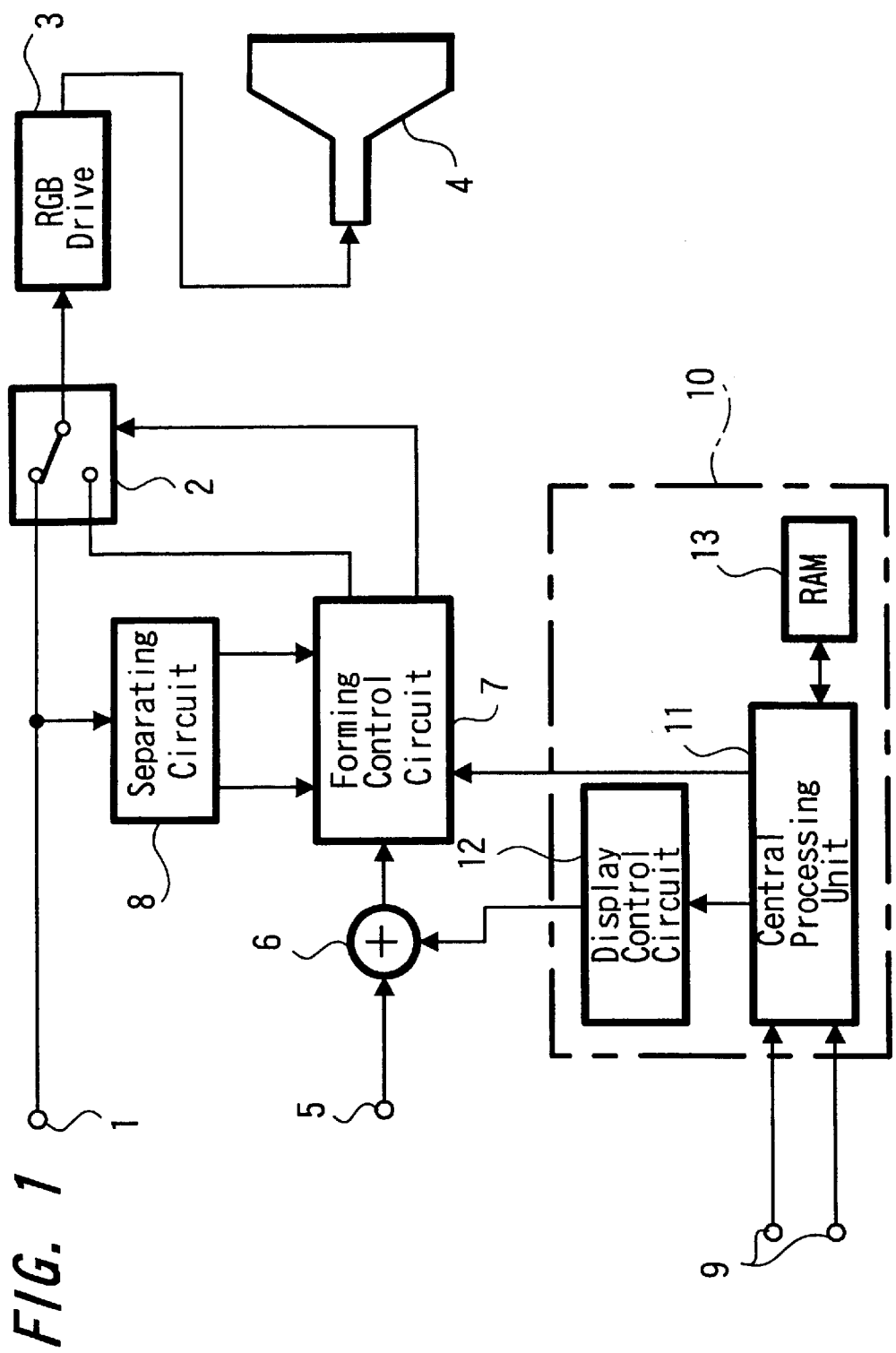
FIG. 1 is a block diagram showing an example of a video appliance to which the present invention is applied.

The present invention will be described below with reference to the attached drawings. FIG. 1 is a block diagram showing an arrangement of a video appliance according to an example of the present invention.

As shown in FIG. 1, for example, a video signal of a main picture screen to be displayed on a display screen is supplied to an input terminal 1. This video signal of the main picture screen is supplied to a change-over switch 2 in which it is changed over with a video signal of a sub-picture screen which will described later on. A video signal from the change-over switch 2 is supplied via a RGB drive circuit 3 to an image receiving tube 4.

Also, a video signal of a sub-picture screen is supplied from an input terminal 5 via an adder 6 for superimposing display, which will be described later on, to a forming control circuit 7 for a sub-picture screen signal. The forming control circuit 7 is supplied with a synchronizing signal separated from the video signal of main picture screen by a separating circuit 8, for example. The video signal of sub-picture screen is compressed to an arbitrary size and delivered at a timing of an arbitrary position on the above display screen to thereby form the video signal of sub-picture screen by the synchronizing signal and change of reading speed from a memory in the forming control circuit 7.

The video signal of sub-picture screen thus formed is supplied to the change-over switch 2. The forming control circuit 7 further forms a change-over signal corresponding to the timing at the arbitrary position on the display screen mentioned above. Then, by the fact that the change-over switch 2 is changed over by the change-over signal and the reading speed from the memory in the forming control circuit 7 is changed, the sub-picture screen of arbitrary size is synthesized at an arbitrary position of main picture screen.

Further, command signals such key input and remote control signals and so on from arbitrary command means are supplied through input terminals 9 to a microcomputer 10. In this microcomputer 10, the command signals are supplied to a central processing unit (CPU) 11 which produces a control signal to decide a size, a position and so on of the sub-picture screen mentioned above. Then, the control signal is supplied to the forming control circuit 7 to thereby control the display position and so on of sub-picture screen.

In the microcomputer 10, a signal from the central processing unit 11 is supplied to a display control circuit 12 which then generates a figure signal for superimposing display. This figure signal is supplied to the adder 6 and then superimposed on the video signal of sub-picture screen.

In the microcomputer 10, the setting values of display size, position and so on of sub-picture screen are recorded on and held in a random access memory (RAM) 13. The setting values are supplied through the control processing unit 11 to the display control circuit 12 to thereby reduce or expand the size of figure in response to expansion or reduction of the above-mentioned sub-picture screen.

Figure 2:
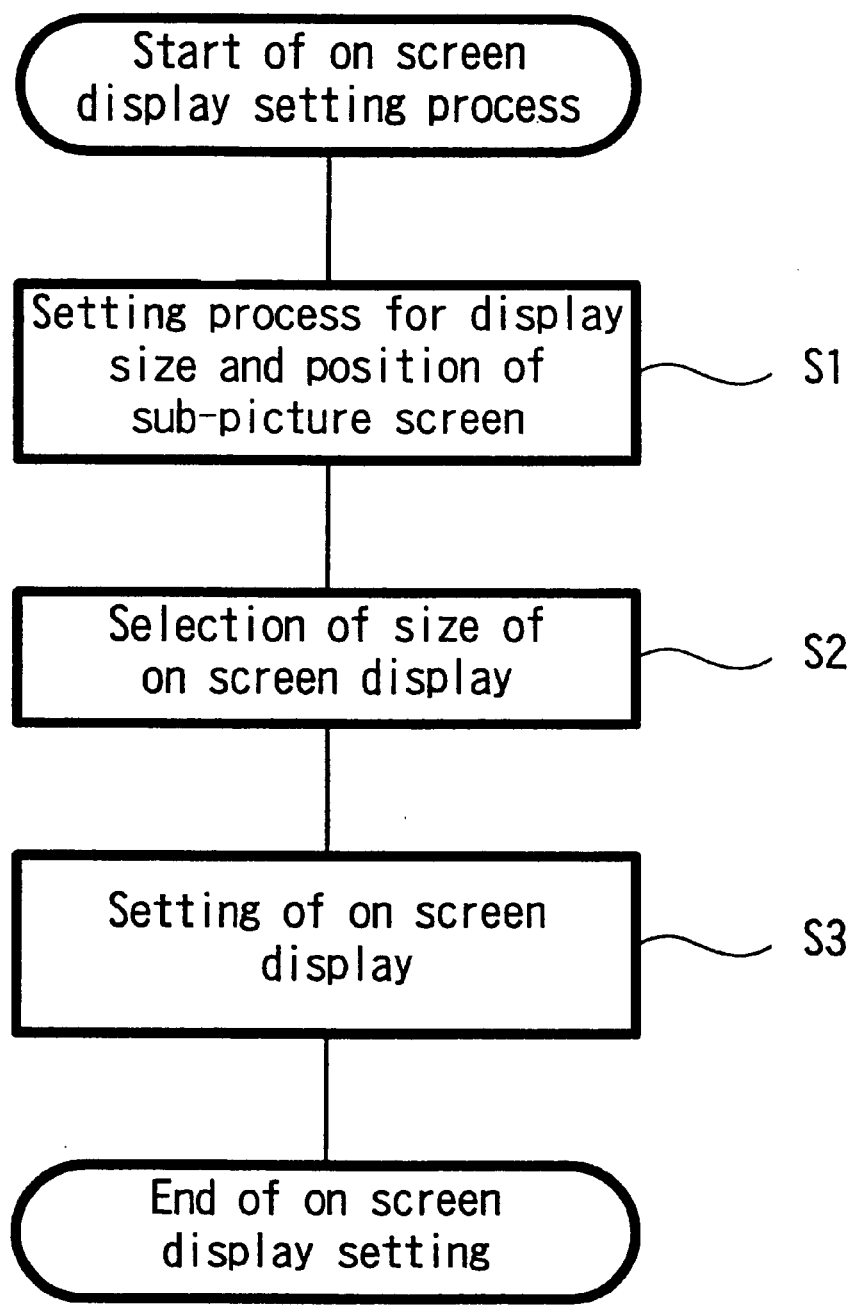
FIG. 2 is a flowchart used to explain a on-screen display setting process.

FIG. 2 shows a flow chart of a on-screen display setting process in the microcomputer 10. In FIG. 2, when the process starts, firstly at step S1 a setting process for a display area (size and position) of an image on the sub-picture screen is carried out. Next, at step S2 the size of on-screen display is selected. Then, at step 3 a setting of on-screen display is carried out in accordance with the selected size, and the on-screen display setting process is ended.

Figure 3:
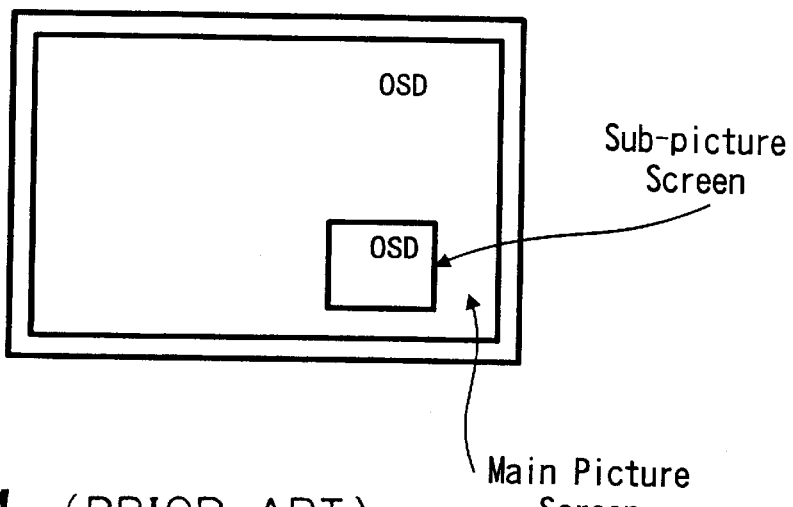
FIG. 3 is a diagram used for explaining an effect by the present invention.
Figure 4A:
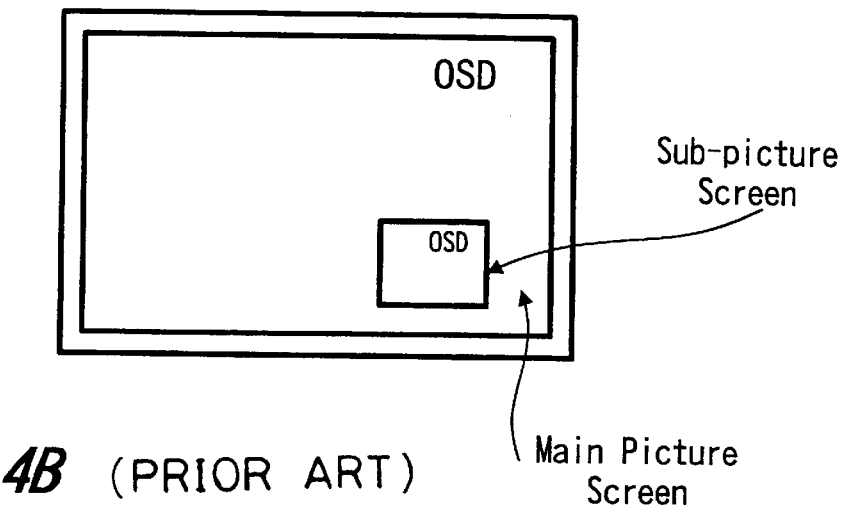
FIGS. 4A and 4B are each a diagram used to explain a superimposing display by a conventional apparatus.
Figure 4B:
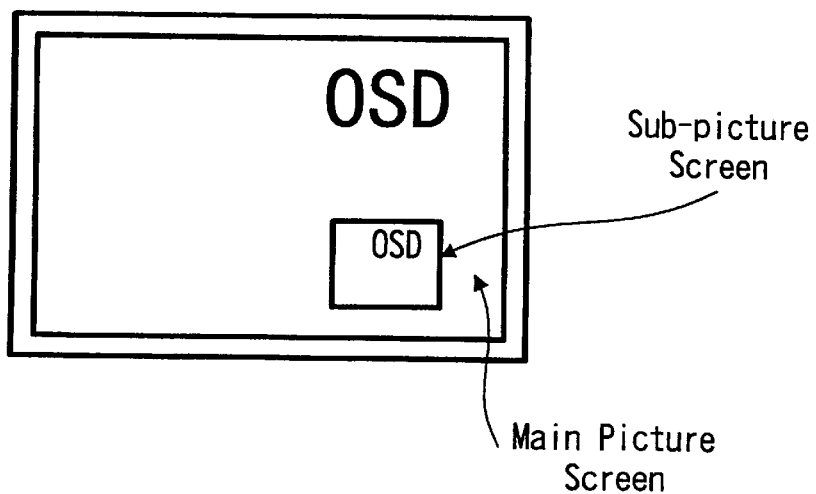

In the process, in order to correspond to the size (expansion or reduction) of sub-picture screen set at step 1, the size of the figure to be superimposed and displayed is selected at step S2 and the size (reduction or expansion) of the figure to be superimposed and displayed is set at step S3, whereby as shown in FIG. 3, for example, even in the sub-picture screen, the figure approximately same in size as that in the main picture screen can be displayed in a superimposing fashion.

Accordingly, in the video equipment, a figure to be superimposed and displayed corresponding to the expansion or reduction of picture screen is reduced or expanded, whereby the size of figure superimposed and displayed is made substantially same even in the reduced picture screen and hence the figure can be visually recognized with ease.

Thus, in the conventional apparatus there is a fear that if a picture screen, in which a superimposing display is presented, is reduced, a figure superimposed and displayed therein becomes very small and hence this figure is difficult to be recognized. The present invention can eliminate the above fear easily.

By the way, the apparatus of the present invention is not limited to the above case where the main picture screen and the sub-picture screen exist but can be applied to a case where a picture screen is merely reduced and/or expanded and then displayed, to a case where a superimposing display is carried out in an information display picture screen by, for example, an arbitrary character and figure, and to a case where a superimposing display is performed in an arbitrary single picture screen among a plurality of picture screens which are displayed together.

According to the video appliance of the present invention, it is possible that on the display picture screen, a picture screen can be arbitrarily expanded or reduced and displayed at an arbitrary position and that a figure to be superimposed and displayed in association with a picture screen is reduced or expanded in correspondence with expansion or reduction of the picture screen, and by expanding or reducing the picture screen after the reduced or expanded figure is superimposed on the picture screen, the size of figure to be displayed in a superimposing fashion is made approximately same even in the reduced picture screen. Thus, the figure can be visually recognized easily.

Therefore, in the conventional apparatus there is a fear that if a picture screen, in which a superimposing display is presented, is reduced, a figure superimposed and displayed becomes very small and hence this figure is difficult to be recognized. However, according to present invention, the problem of the above fear can be eliminated easily.

Having described a preferred embodiment of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A display control apparatus including a display screen whereon an on-screen-display superimposed on a sub-picture screen is displayed at an arbitrary position of a main picture screen, said display control apparatus comprising:
   means for deciding a size of said sub-picture screen in response to an input signal; and
   means for controlling a size of said on-screen-display in response to said size of said sub-picture screen so that said size of said on-screen-display is made substantially the same regardless of said size of said sub-picture screen.

2. A display control method for use in an apparatus including a display screen whereon an on-screen-display superimposed on a sub-picture screen is displayed at an arbitrary position of a main picture screen, said display control method comprising the steps of:
   deciding a size of said sub-picture screen in response to an input signal; and
   controlling a size of said on-screen-display in response to said size of said sub-picture screen so that said size of said on-screen-display is made substantially the same regardless of said size of said sub-picture screen.

* * * * *